United States Patent
Nguyen

(10) Patent No.: US 10,216,069 B2
(45) Date of Patent: Feb. 26, 2019

(54) MULTI-PIVOT CAMERA HARNESS

(71) Applicant: Quan Van Nguyen, San Jose, CA (US)

(72) Inventor: Quan Van Nguyen, San Jose, CA (US)

( * ) Notice: Subject to any disclaimer, the term of this patent is extended or adjusted under 35 U.S.C. 154(b) by 40 days.

(21) Appl. No.: 15/179,531

(22) Filed: Jun. 10, 2016

(65) Prior Publication Data
US 2016/0363838 A1  Dec. 15, 2016

Related U.S. Application Data

(60) Provisional application No. 62/174,137, filed on Jun. 11, 2015.

(51) Int. Cl.
| G03B 17/56 | (2006.01) |
| A45F 3/14 | (2006.01) |
| A45F 5/02 | (2006.01) |

(52) U.S. Cl.
CPC .............. *G03B 17/561* (2013.01); *A45F 3/14* (2013.01); *A45F 5/021* (2013.01); *G03B 17/563* (2013.01); *A45F 2003/142* (2013.01); *A45F 2003/146* (2013.01); *A45F 2200/0533* (2013.01)

(58) Field of Classification Search
USPC .................................................. 396/419, 423
See application file for complete search history.

(56) References Cited

U.S. PATENT DOCUMENTS

| 3,152,738 A | * | 10/1964 | Worsfold, Jr. | A45F 5/00 224/259 |
| 3,602,409 A | * | 8/1971 | Kerns | A45C 11/38 224/258 |
| 4,091,974 A | * | 5/1978 | McClintock | A45F 5/00 224/257 |
| 4,320,863 A | * | 3/1982 | Lyer | A45F 3/14 224/259 |
| 4,461,411 A | * | 7/1984 | Harrow | A45F 5/00 224/258 |
| 5,361,953 A | * | 11/1994 | Nichols | F41C 33/0227 224/192 |
| 5,984,157 A | * | 11/1999 | Swetish | A45F 3/10 224/631 |
| 6,568,575 B1 | * | 5/2003 | Bartholomew | A45F 5/00 224/258 |
| 7,387,225 B2 | * | 6/2008 | Fox | A45F 3/14 224/257 |
| D683,384 S | * | 5/2013 | Swaggart | D16/243 |
| 2002/0088836 A1 | * | 7/2002 | Batten | A45F 3/047 224/645 |
| 2002/0108165 A1 | * | 8/2002 | Porter | A42B 1/22 2/195.2 |
| 2009/0057360 A1 | * | 3/2009 | Demsky | A45F 3/047 224/262 |
| 2010/0308089 A1 | * | 12/2010 | Chien | A45F 5/00 224/183 |

(Continued)

*Primary Examiner* — Clayton E Laballe
*Assistant Examiner* — Linda B Smith
(74) *Attorney, Agent, or Firm* — Haverstock & Owens LLP

(57) ABSTRACT

A camera strap comprises one or more instantly attachable and detachable coupling mechanisms for host multiple cameras. In some embodiments, the camera strap comprises six rotating points allowing the camera strap to adjust its configuration to fit the body configuration of the wearer, which provides comfort and prevents injury to the wearer.

10 Claims, 7 Drawing Sheets

(56) References Cited

U.S. PATENT DOCUMENTS

| | | | |
|---|---|---|---|
| 2013/0221189 A1* | 8/2013 | Kubin | F16M 13/04 |
| | | | 248/683 |
| 2013/0233902 A1* | 9/2013 | Henry | A45F 3/12 |
| | | | 224/600 |
| 2013/0306821 A1* | 11/2013 | Lotz, III | A45F 5/00 |
| | | | 248/315 |
| 2014/0042294 A1* | 2/2014 | Marzynski | A45F 5/00 |
| | | | 248/693 |
| 2015/0108301 A1* | 4/2015 | Troy | B25H 3/00 |
| | | | 248/206.5 |

* cited by examiner

MULTI-PIVOT CAMERA HARNESS

CROSS-REFERENCE TO RELATED APPLICATION(S)

This application claims priority under 35 U.S.C. § 119(e) of the U.S. Provisional Patent Application Ser. No. 62/174,137, filed Jun. 11, 2015 and titled, "A CAMERA STRAP," which is hereby incorporated by reference in its entirety for all purposes.

FIELD OF THE INVENTION

The present invention relates to the field of photographic equipment. More specifically, the present invention relates to a wearable camera strap with an immobilizing mechanism.

SUMMARY OF THE INVENTION

In an aspect, a camera strap comprises one or more instant attachable and detachable coupling mechanisms for hosting multiple cameras. In some embodiments, the camera strap comprises six rotating points allowing the camera strap to adjust its configuration to fit the body configuration of a user, which provides comfort and prevents injury to the user. In some embodiments, the camera strap comprises hooking straps sliding along a body of the camera strap. Each hooking strap is able to couple with a camera, such that each of the cameras is able to have a sliding motion along the body of the user without dropping to the ground. In some embodiments, three cameras are coupled with the camera strap. Two cameras are able to be at each side of the user's legs and one camera is able to be secured near the chest of the user. In some embodiments, a first magnet is located at or around the waist of the user, which is able to immobilize or reduce the motion of the camera when the first magnet couples a second magnet on a securing member coupling with the camera.

In another aspect, a camera strap comprises one or more overlapping straps over the shoulder portion. In some embodiments, a wide strap transverses around and on top of a user's shoulder, wherein the wide strap comprises a comfort pad. In some embodiments, the comfort pad comprises a leather piece, a sponge, and/or any other elastic materials such as polymers/silicone. The wide strap distributes the weight of the hanging camera and provides comfort to the user.

In an aspect, a photographic equipment carrying device comprises a body, one or more rotating points coupling with the body allowing a snug-fit configuration of the carrying device, and one or more securing mechanisms for securing one or more cameras.

In some embodiments, the body comprises one or more shoulder straps. In other embodiments, the body comprises one or more chest straps. In some other embodiments, the one or more rotating points connecting the one or more chest straps with the one or more shoulder straps. In some embodiments, the body comprises a back member. In other embodiments, the back member couples with the one or more chest straps and the one or more shoulder straps via the one or more rotating points. In some other embodiments, the one or more rotating points comprise four connectors at back side of the body. In some embodiments, two of the four connectors connect the one or more chest straps with the back member. In other embodiments, two of the four connectors connect the one or more shoulder straps with the back member. In some other embodiments, the one or more rotating points comprises two connectors at front side of the body connecting the one or more chest straps with the one or more shoulder straps. In some embodiments, the chest strap couples with one or more swing members, wherein the swing members couple with a photographic equipment. In other embodiments, the body comprises two snap-replaceable chest camera straps coupling with a photographic equipment. In some other embodiments, the body comprises a replacement strap having a length for snug-fit going under an armpit. In some embodiments, the body comprises a swing member having a magnet configured to immobilize a camera.

In another aspect, a method of using a camera carrying device comprises wearing the camera carrying device having self-adjusting connectors, wherein the self-adjusting connectors adjust a configuration of the camera carrying device based on a body shape of a user and coupling a first photographic equipment with the camera carrying device. In some embodiments, the method further comprises coupling a second photographic equipment with the camera carrying device at an opposite side across a body of the user. In other embodiments, the method further comprises coupling a third photographic equipment with the camera carrying device near a chest of the user. In some other embodiments, the method further comprises decoupling a stabilizing device by reducing a magnetic force. In some embodiments, the method further comprises pulling up the photographic equipment sliding along a body strap of the camera carrying device.

In another aspect, a photographic equipment carrying device comprising a body, at least two front rotating points located at a front side of the body, shoulder straps coupled with chest straps by the at least two front rotating points, at least four back rotating points located at a back side of the body, a back unit coupled with the shoulder straps by two of the at least four back rotating points, a swing member coupled with a camera, such that the camera is configured to be freely move along the chest straps, and one or more securing mechanisms coupled to the body securing the cameras.

BRIEF DESCRIPTION OF THE DRAWINGS

Embodiments will now be described by way of examples, with reference to the accompanying drawings which are meant to be exemplary and not limiting. For all figures mentioned herein, like numbered elements refer to like elements throughout.

DETAILED DESCRIPTION OF THE PREFERRED EMBODIMENT

Reference is made in detail to the embodiments of the present invention, examples of which are illustrated in the accompanying drawings. While the invention is described in conjunction with the embodiments below, it is understood that they are not intended to limit the invention to these embodiments and examples. On the contrary, the invention is intended to cover alternatives, modifications and equivalents, which can be included within the spirit and scope of the invention as defined by the appended claims. Furthermore, in the following detailed description of the present invention, numerous specific details are set forth in order to more fully illustrate the present invention. However, it is apparent to one of ordinary skill in the prior art having the benefit of this disclosure that the present invention can be practiced without these specific details. In other instances, well-known methods and procedures, components and processes have not been described in detail so as to not to unnecessarily obscure aspects of the present invention. It is, of course, appreciated that in the development of any such actual implementation, numerous implementation-specific decisions must be made in order to achieve the developer's specific goals, such as compliance with application and business related constraints, and that these specific goals vary from one implementation to another and from one developer to another. Moreover, it is appreciated that such a development effort can be complex and time-consuming, but is nevertheless a routine undertaking of engineering for those of ordinary skill in the art having the benefit of this disclosure.

Figure 1:
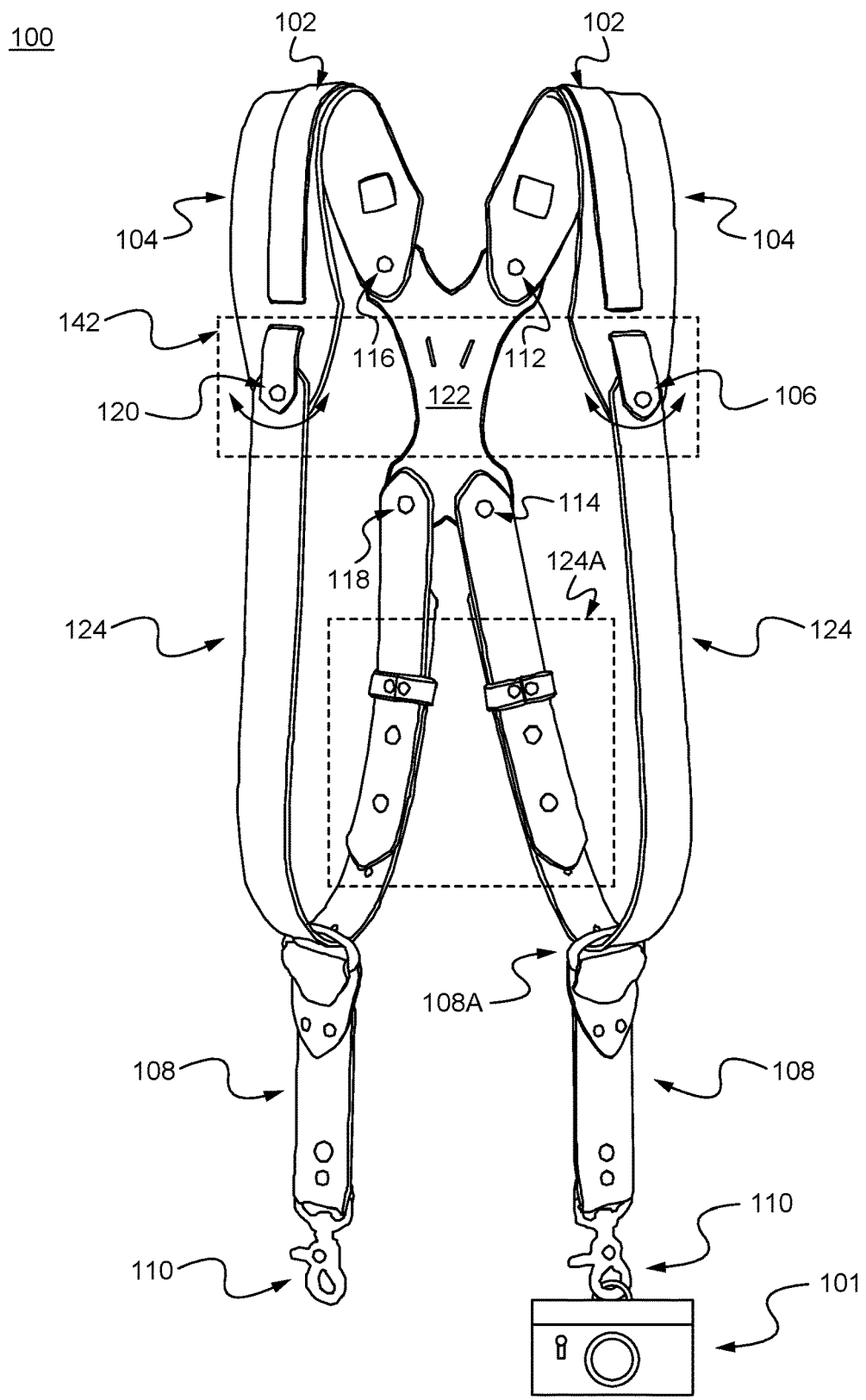
FIG. 1 is a prospective front view illustrating a multiple camera carrier in accordance with some embodiments.

FIG. 1 is a prospective front view illustrating a multiple camera carrier 100 in accordance with some embodiments. In some embodiments, the carrier 100 comprises one or more shoulder straps 102, one or more body straps 124, one or more swing members 108, and a back member 122. The shoulder straps 102, the body straps 124, and the back member 122 are able to be connected by the connectors 106, 112, 114, 116, 118, and 120. In some embodiments, the connectors 106, 112, 114, 116, 118, and 120 form a six pivot turning connector, which provides a function of a self-adjusting configuration based on the body figure and body type of a user. The connectors 106, 112, 114, 116, 118, and 120 are able to be grouped into front connectors 106 and 120 and back connectors 112, 114, 116, and 118. The front connectors are able to self-adjust their configuration based on the front and side body shape of the user. Similarly, the back connectors are able to self-adjust their configuration based on the back and side body shape of the user. Each of the connectors 106, 112, 114, 116, 118, and 120 are pivotally rotatable (horizontally or vertically). Each of the connectors 106, 112, 114, 116, 118, and 120 are able to independently rotate.

In some embodiments, a shoulder pad 104 is underneath the shoulder straps 102. The shoulder straps 102 carry substantially all of the weight of the objects 101 when the objects 101 (e.g., camera) are attached. In some embodiments, the shoulder pad 104 is wider than the shoulder straps 102 and distributes weight and provides comfort throughout the length of the user's shoulders.

In some embodiments, the body strap 124 couples with one or more swing members 108 via a ring 108A at a proximal end. In some embodiments, the distal end of the swing member 108 couples with a hook 110, which can be coupled with a tripod mount connector of a camera.

In some embodiments, the swing members 108 with the ring structure 108A form a construction allowing the user to quickly raise a camera to a predetermined angle, position, or height without hindrance. Similarly, the swing members 108 with the ring structure 108A form a safety construction allowing the user to release the camera with a support force generated by the carrier 100 preventing the camera falls on the ground.

In some embodiments, both side of the body straps 124 couple with the back member 122 via the connectors 114 and 118 at the lower end of the back member 122. In some embodiments, both sides of the shoulder straps 102 couple with the back member 122 via the connectors 112 and 116 at the upper end of the back member 122. For the back connectors 112, 114, 116, and 118, the back member 122 forms a base structure 140 allowing the back connectors 112, 114, 116, and 118 to pivotally rotate and adapt/configure to the user's body figure.

Figure 2:
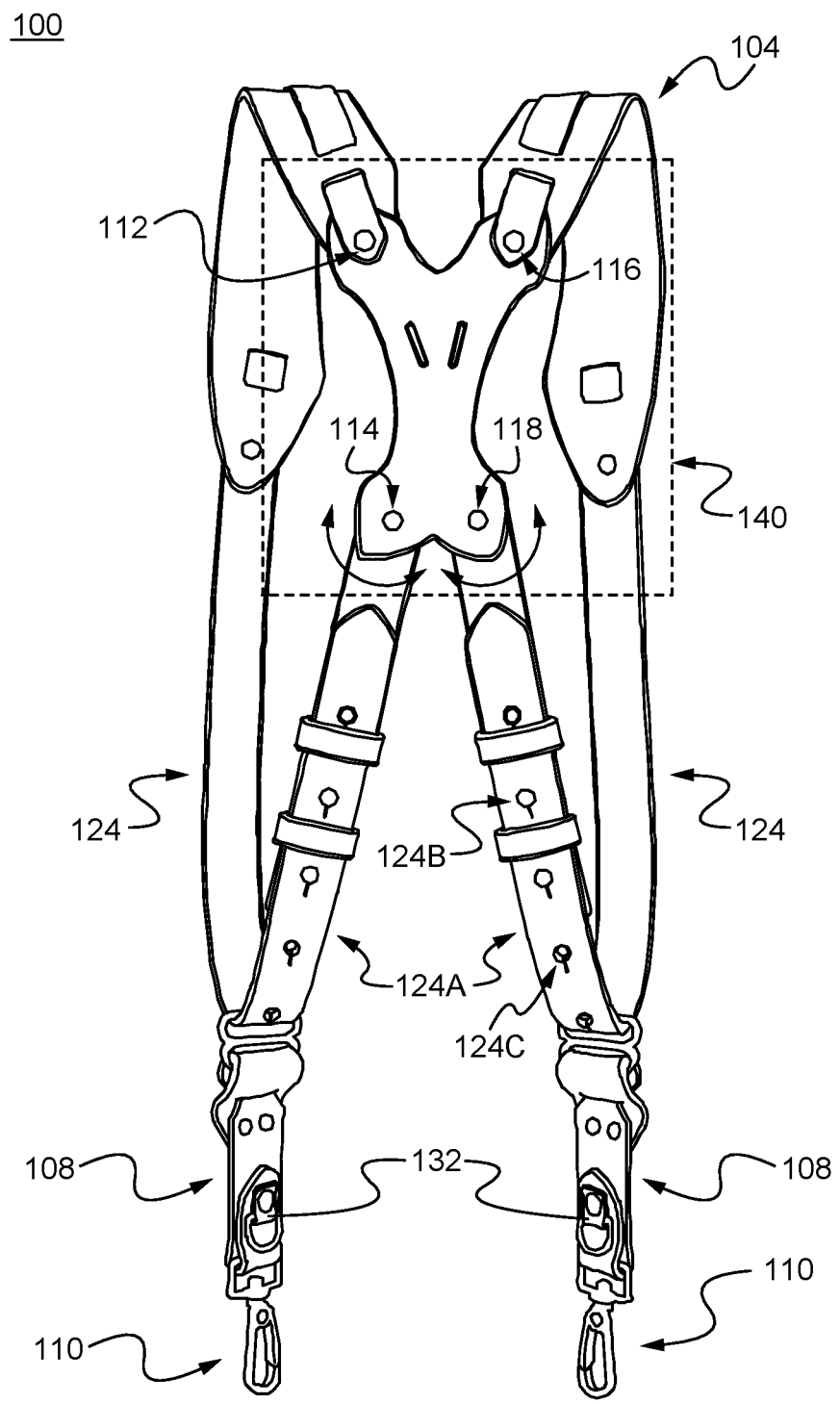
FIG. 2 is a back view illustrating the multiple camera carrier in accordance with some embodiments.

FIG. 2 is a back view illustrating the multiple camera carrier 100 in accordance with some embodiments. In some embodiments, the upper connectors 116 and 112 are able to rotatably adjust their configurations into a wide or narrow configurations based on the shoulder and/or chest size of the user. In some embodiments, the lower connectors 114 and 118 are able to rotatably adjust their configurations into a wide or narrow configuration, such that the user is able to perform various movements of swinging the camera 101 independently without changing the positions of the shoulder pad 104.

In some embodiments, the body strap 124 comprises a sliding and snapping size adjustment structure 124A. In some embodiments, the body strap 124 comprises a ball shaped hardware 124B to be retained by one or more holes 124C. In some embodiments, the loops 132 on the swing member 108 are used as secondary attachment to camera tripod mount area.

Figure 3:
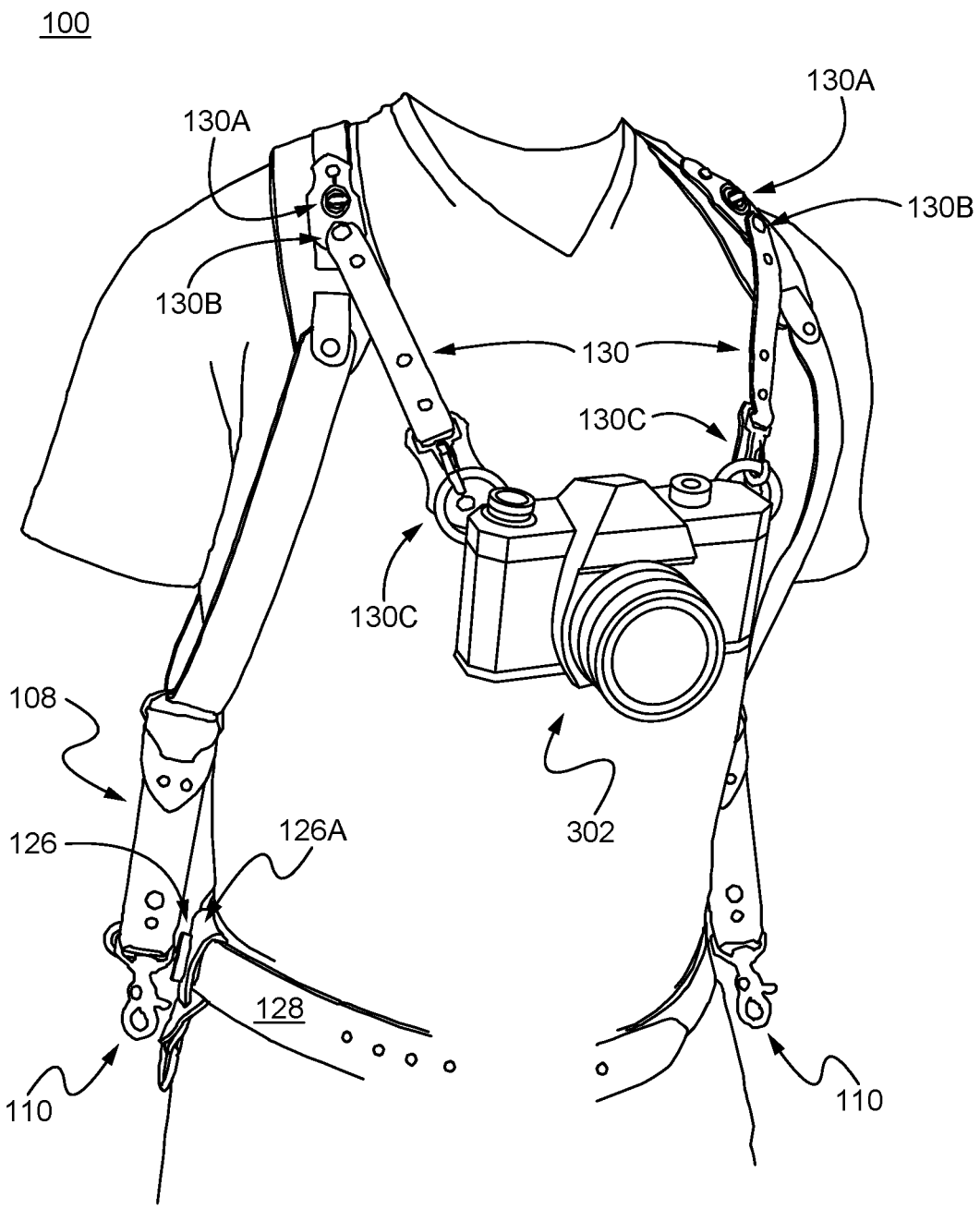
FIG. 3 illustrates a use of the multiple camera carrier in accordance with some embodiments.

FIG. 3 illustrates a use of the multiple camera carrier 100 in accordance with some embodiments. In some embodiments, the carrier 100 comprises a chest strap 130 for coupling with an object 302 (e.g., a camera). In some embodiments, the carrier 100 is able to carry/couple with three cameras including two cameras using the two hooks 110 and one camera using the chest strap 130. In some embodiments, the chest strap 130 comprises two side hooks 130C, which serve as a locking mechanism for immobilizing the camera 302. The camera 302 is able to be quickly detached by unlocking and pulling the chest strap 130 upwards. The carrier 100 comprises two connectors 130B allowing the chest strap 130 to independently rotate without affecting the positions of the shoulder pad 104.

In some embodiments, the carrier 100 comprises a belt 128. In some embodiments, the belt 128 comprises a metal 126A (magnetic or paramagnetic material), which is able to couple with a magnetic or paramagnetic material of the disk 126 on the swing member 108. The material 126A and the disk 126 forms a stabilizing mechanism 502 (FIG. 5) to secure the cameras from swinging while providing a quick shooting-mode disconnecting structure.

Figure 4:
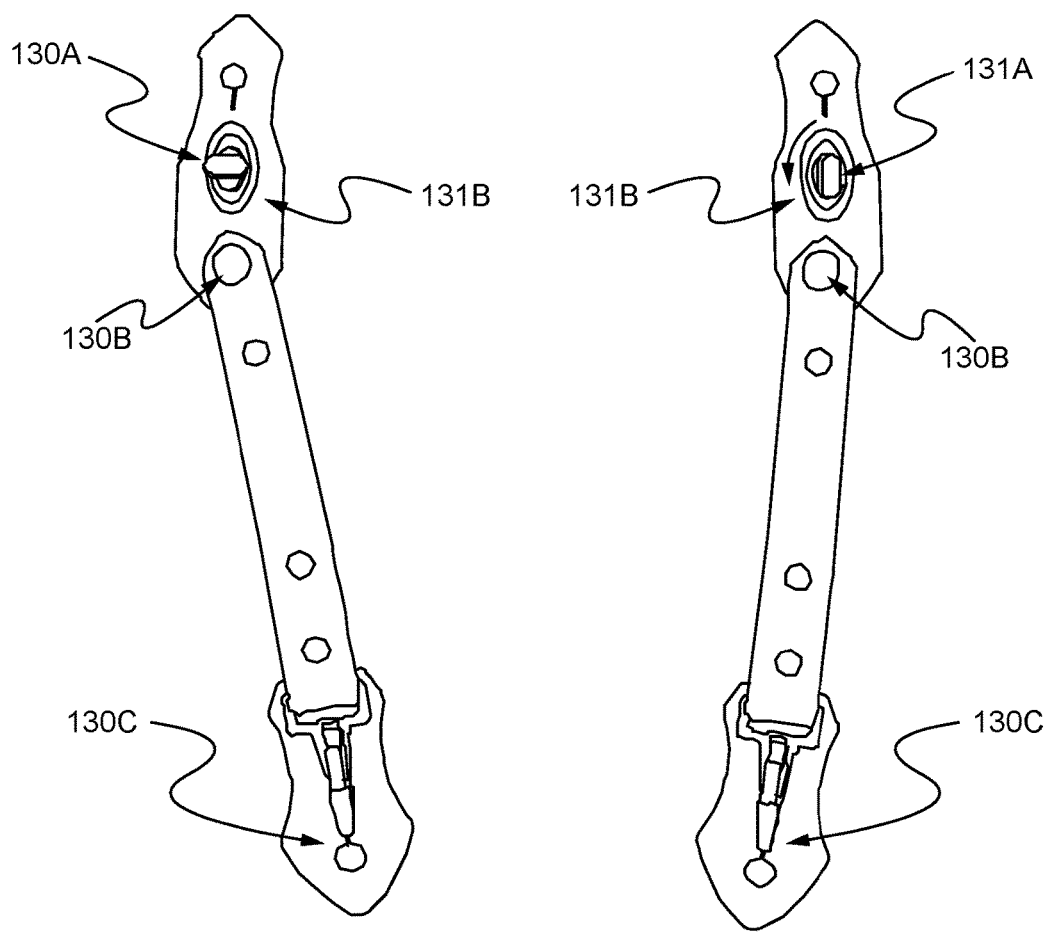
FIG. 4 illustrates an operational mode of the chest strap in accordance with some embodiments.

FIG. 4 illustrates an operational mode of the chest strap 130 in accordance with some embodiments. In some embodiments, the chest strap 130 is in a locked mode 130A, such that the chest strap 130 is attached/locked to the carrier 100. When in use for photo shooting, the lock 131B is turned to a disconnecting mode 131A, such that the locking bolt can come out of the hole of the lock 131B and the chest strap 130 can be removed from coupling with the carrier 100. In the disconnecting mode 131A, the camera 302 is able to be quickly pulled up for photo shooting.

Figure 5:
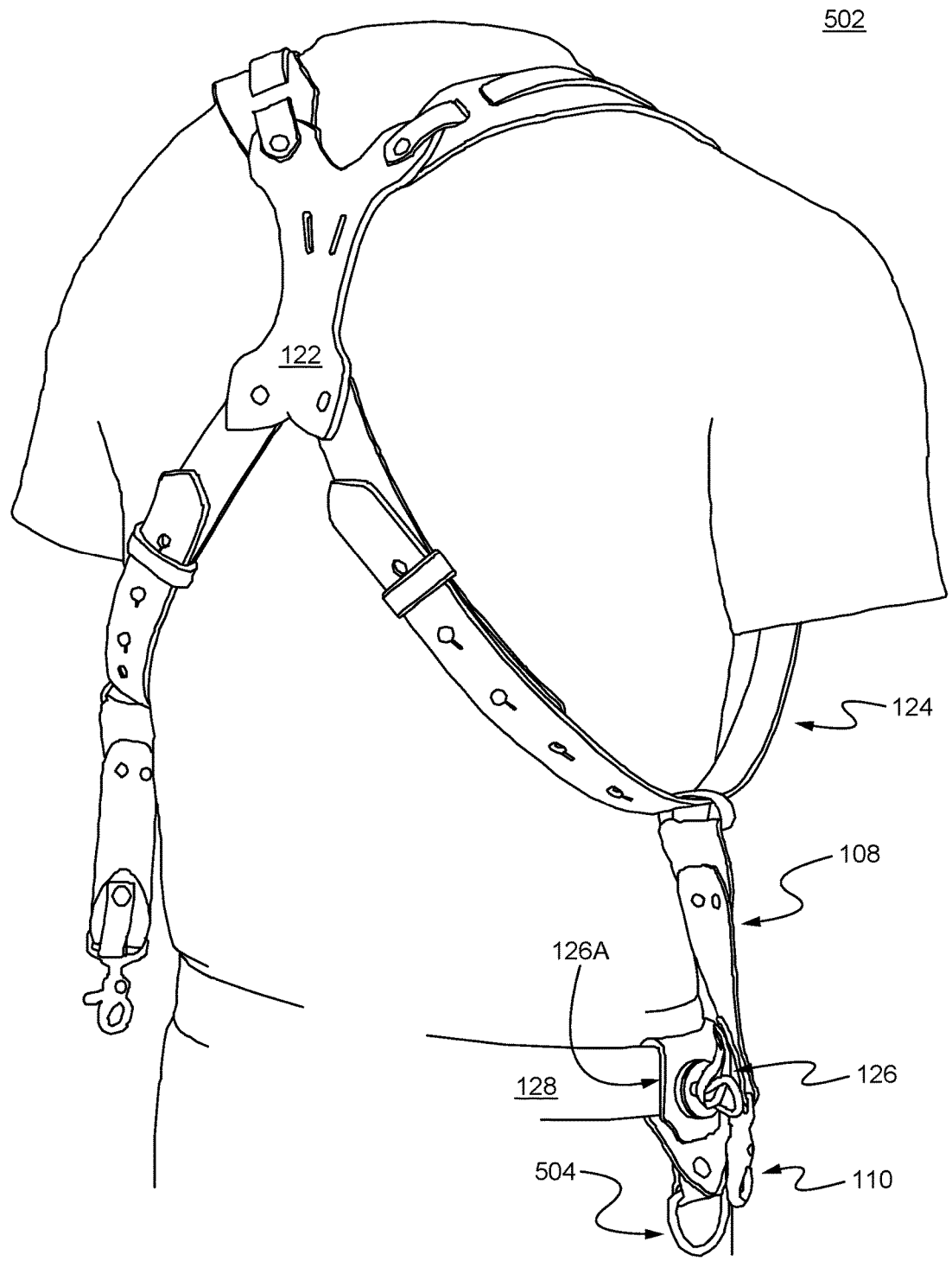
FIG. 5 illustrates a side view of the stabilizing mechanism in accordance with some embodiments.

FIG. 5 illustrates a side view of the stabilizing mechanism 502 in accordance with some embodiments. As shown, the disk 126 is immobilized on the metal 126A. In some embodiments, the carrier 100 comprises a D-ring 504.

Figure 6:
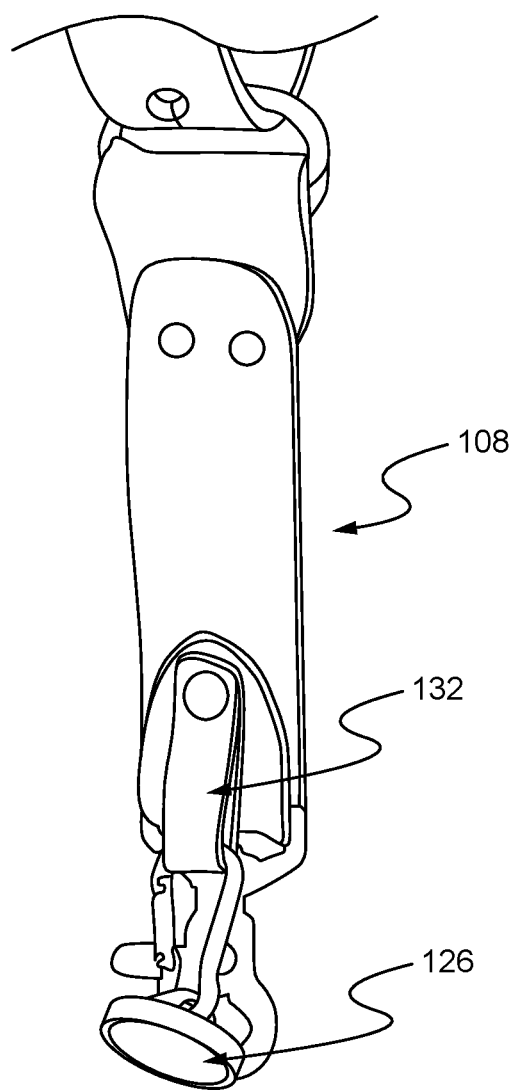
FIG. 6 illustrates the swing member in accordance with some embodiments.

FIG. 6 illustrates the swing member 108 in accordance with some embodiments. As shown, the disk 126 (e.g., a magnetic disk) is at an unengaged state, which is not coupled with the metal 126A. A person of ordinary skill in the art would appreciate that the disk 126 and the metal 126A are able to be configured in various shapes so long as the disk 126 and the metal piece 126A are able to be coupled with each other through a magnetic force.

Figure 7:
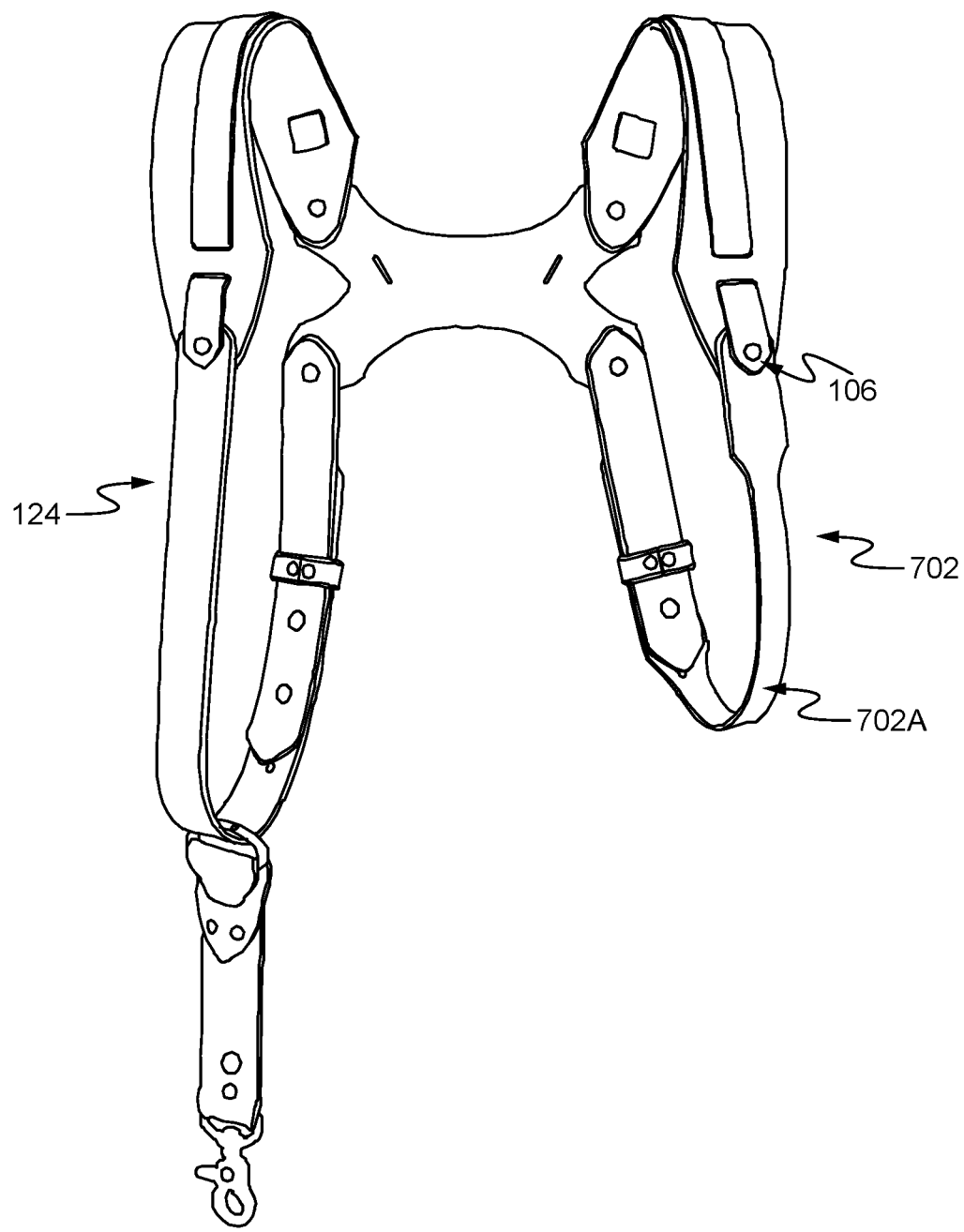
FIG. 7 illustrates a replacement strap in accordance with some embodiments.

FIG. 7 illustrates a replacement strap 702 in accordance with some embodiments. In some embodiments, one or more replacement straps 702 is used to replace a body strap 124. The replacement strap 702 has a tapered portion for streamline fitting under the armpit region of the user while maintaining a secured hold on the body.

In utilization, the camera strap is used to secure a camera and immobilize the position of the shoulder comforting pad.

In operation, a user is able to couple a camera with the camera strap using the instant release hook on the strap and use six rotating points for self-adjusting configuration to fit the body shape of the user.

The present invention has been described in terms of specific embodiments incorporating details to facilitate the understanding of principles of construction and operation of the invention. Such reference herein to specific embodiments and details thereof is not intended to limit the scope of the claims appended hereto. It is readily apparent to one skilled in the art that other various modifications can be made in the embodiment chosen for illustration without departing from the spirit and scope of the invention as defined by the claims.

What is claimed is:

1. A photographic equipment carrying device comprising:
  a body, wherein the body comprises:
    two separate body straps;
    two separate shoulder straps; and
    a back member;
  three pairs of rotating points coupled with the body allowing a snug-fit configuration of the carrying device, wherein the two separate body straps are coupled with the back member by a first pair of rotating points and are coupled with the two separate shoulder straps by a second pair of rotating points, wherein the two separate shoulder straps are coupled with the back member with a third pair of rotating points; and
  one or more securing mechanisms coupled to the body securing one or more cameras, wherein the body comprises at least one swing members coupling with a photographic equipment, wherein each of the at least one swing members comprise a ring structure sliding along one of the two body straps.

2. The device of claim 1, wherein the body comprises two separate chest straps, wherein each of the two separate chest straps is rotatably coupled with one of the two separate shoulder straps and comprises a hook structure coupling with another photographic equipment.

3. The device of claim 1, wherein the first pair of rotating points and the third pair of rotating points are at a back side of the body.

4. The device of claim 1, wherein the second pair of rotating points is at a front side of the body.

5. A method of using a camera carrying device comprising:
  wearing the camera carrying device having six point self-adjusting connectors, wherein all of the six point self-adjusting connectors rotatably adjust a configuration of the camera carrying device based on a body shape of a user, wherein four of the six point self-adjusting connectors are at a back of the camera carrying device and two of the six point self-adjusting connectors are at a front of the camera carrying device; and
  coupling a first photographic equipment with the camera carrying device, wherein the camera carrying device comprising:
    a body having a shoulder strap, a body strap, and a back member, wherein the shoulder strap, the body strap, and the back member formforms a complete circle around a torso of the user; and
    a swing member with a ring structure having one or more securing mechanisms coupled to the body strap securing one or more cameras, wherein the swing member is structured to slide along the body strap.

6. The method of claim 5, further comprising coupling a second photographic equipment with the camera carrying device at an opposite side across a body of the user.

7. The method of claim 5, further comprising coupling a third photographic equipment with the camera carrying device near a chest of the user.

8. A photographic equipment carrying device comprising:
  a body;
  at least two front rotating points located at a front side of the body;
  shoulder straps coupled with body straps by the at least two front rotating points;
  at least four back rotating points located at a back side of the body;
  a back unit coupled with the shoulder straps by two of the at least four back rotating points;
  a swing member coupled with a camera, wherein the swing member comprises a ring structure, such that the camera is configured to be freely sliding along the body straps using a ring structure of the swing member; and
  one or more securing mechanisms on the swing member securing the cameras near a waist of a user.

9. A photographic equipment carrying device comprising:
  a body;
  three pairs of rotating points coupled with the body allowing a snug-fit configuration of the carrying device, wherein two of the three pairs of rotating points are at a back of the body and one of the three pairs of rotating points is at a front of the body; and
  a swing strap having one or more securing mechanisms coupled to the body securing one or more cameras, wherein the swing strap is configured to slide along a body strap using a ring structure.

10. A photographic equipment carrying device comprising:
  a body;
  three pairs of rotating points coupled with the body allowing a snug-fit configuration of the carrying device, wherein two of the three pairs of rotating points are at a back of the body and one of the three pairs of rotating points is at a front of the body; and
  a swing strap having one or more securing mechanisms coupled to the body securing one or more cameras, wherein the body comprises a swing member having a magnet configured to immobilize a camera, wherein the swing strap is configured to slide along a body strap using a ring structure.

* * * * *

UNITED STATES PATENT AND TRADEMARK OFFICE
CERTIFICATE OF CORRECTION

PATENT NO. : 10,216,069 B2
APPLICATION NO. : 15/179531
DATED : February 26, 2019
INVENTOR(S) : Quan Van Nguyen It is certified that error appears in the above-identified patent and that said Letters Patent is hereby corrected as shown below:

In the Claims

Column 6, Line 12, Claim 5 replace "formforms" with -- form --.

Signed and Sealed this
Nineteenth Day of November, 2019

Andrei Iancu
*Director of the United States Patent and Trademark Office*